United States Patent [19]
Boaz

[11] Patent Number: 5,782,947
[45] Date of Patent: Jul. 21, 1998

[54] METHOD FOR HEATING A GLASS SHEET

[75] Inventor: Premakaran Tucker Boaz, Livonia, Mich.

[73] Assignee: Ford Global Technologies, Inc., Dearborn, Mich.

[21] Appl. No.: 969,091

[22] Filed: Nov. 12, 1997

Related U.S. Application Data

[63] Continuation of Ser. No. 524,500, Sep. 7, 1995, abandoned.

[51] Int. Cl.⁶ ...................................................... C03B 29/00
[52] U.S. Cl. ........................ 65/111; 65/114; 65/104; 65/106; 219/678; 219/680; 264/432; 264/489; 432/18
[58] Field of Search ..................... 65/102, 104, 106, 65/107, 111, 114; 219/678, 680, 764, 773; 264/432, 489; 432/1, 9, 11, 18

[56] References Cited

U.S. PATENT DOCUMENTS

| | | |
|---|---|---|
| 2,145,119 | 1/1939 | Littleton . |
| 2,178,520 | 10/1939 | Howard . |
| 2,223,124 | 11/1940 | Owen . |
| 3,406,022 | 10/1968 | Gehenot . |
| 3,545,951 | 12/1970 | Nedelec . |
| 3,875,766 | 4/1975 | French . |
| 3,938,980 | 2/1976 | French . |
| 4,065,284 | 12/1977 | Mang et al. . |
| 4,100,386 | 7/1978 | Bardet . |
| 4,226,608 | 10/1980 | McKelvey . |
| 4,606,748 | 8/1986 | Blake et al. . |
| 4,838,915 | 6/1989 | Hässler . |
| 5,306,324 | 4/1994 | Vehmas et al. . |
| 5,324,345 | 6/1994 | Rutjes et al. . |
| 5,352,263 | 10/1994 | Kuster et al. . |
| 5,656,053 | 8/1997 | Boaz .......................... 65/106 |

FOREIGN PATENT DOCUMENTS

| | | |
|---|---|---|
| 0000269 | 1/1979 | European Pat. Off. . |
| 0363097 | 4/1990 | European Pat. Off. . |
| 0476693 | 3/1992 | European Pat. Off. . |
| 0546617 | 6/1993 | European Pat. Off. . |
| 686549 | 1/1940 | Germany . |
| 707141 | 6/1941 | Germany . |
| 1680646 | of 1989 | U.S.S.R. . |
| WO93/06052 | 4/1993 | WIPO . |

OTHER PUBLICATIONS

Robert Gardon, "The Tempering of Flat Glass By Forced Convection", pp. 1–33.
Robert Gardon, "Calculation of Temperature Distributions in Glass Plates Undergoing Heat–Treatment", Jun. 1958, pp. 200–209.

*Primary Examiner*—Steven P. Griffin
*Attorney, Agent, or Firm*—Lorraine S. Melotik Esq.; Roger L. May, Esq.

[57] ABSTRACT

A method for heating a glass sheet includes the steps of heating a glass sheet to a first predetermined temperature and applying microwave energy to the glass sheet to heat the glass sheet to at least a second predetermined temperature to allow the glass sheet to be formed.

19 Claims, 2 Drawing Sheets

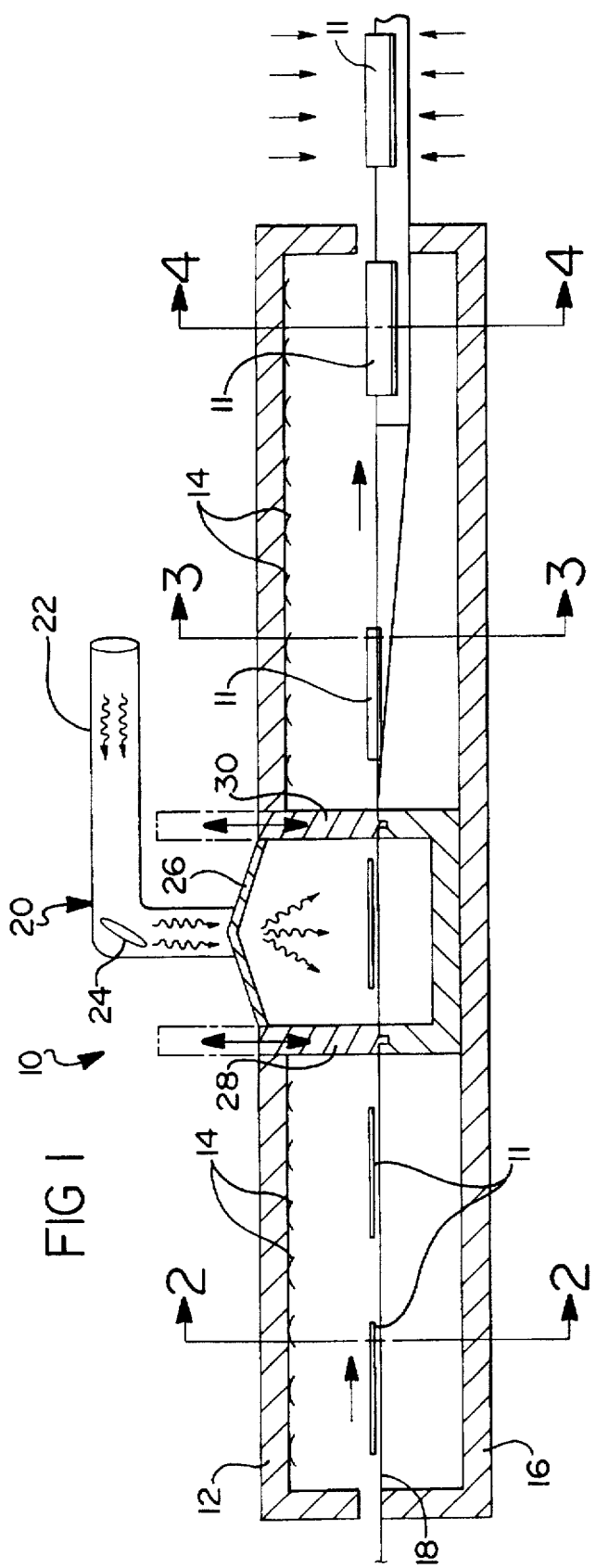
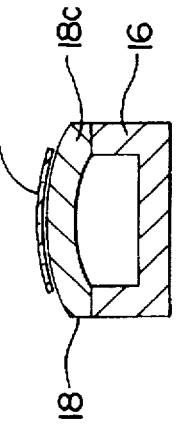
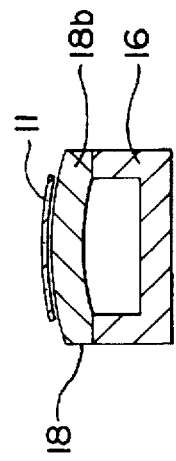
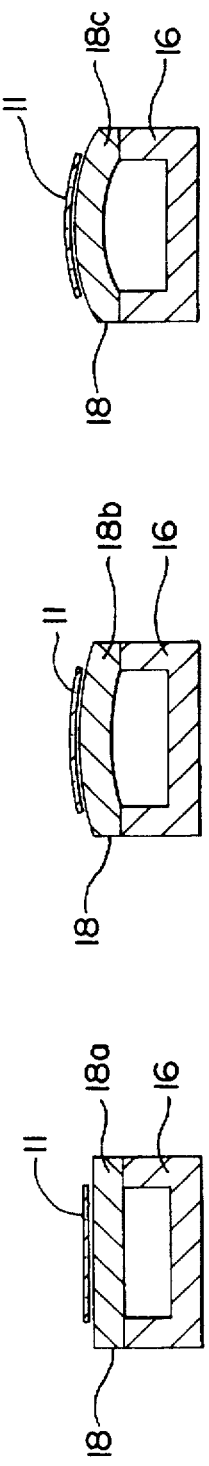

METHOD FOR HEATING A GLASS SHEET

CROSS-REFERENCES TO RELATED APPLICATIONS

This is a continuation of U.S. patent application Ser. No. 08/524,500, filed Sep. 7, 1995, now abandoned.

The present application is related to Ser. No. 08/524,495, filed Sep. 7, 1995, now U.S. Pat. No. 5,656,053, and entitled "METHOD FOR HEATING AND FORMING A GLASS SHEET" and Ser. No. 08/524,493, filed Sep. 7, 1995, now abandoned, and entitled "METHOD FOR HEATING, FORMING AND TEMPERING A GLASS SHEET".

GOVERNMENT RIGHTS IN INVENTION

The U.S. Government has rights in the present invention as provided for by the terms of Contract No. IPO95-10043-003 awarded by the Department of Energy.

BACKGROUND OF THE INVENTION

1. Field of the Invention

The present invention relates generally to glass sheets and, more specifically, to a method for heating a glass sheet.

2. Description of the Related Art

It is known to heat glass sheets using a "hearth" or "lehr". Generally, the lehr is a furnace and may be of a continuous roller-type, fixtured roller-type or gas-type. For example, a gas-type lehr has a plurality of blocks disposed beneath a plurality of radiant heaters. Typically, a glass sheet is placed inside the lehr where it is heated by conventional radiation, convection and conduction heat. The glass sheet is moved along the blocks at a predetermined rate which depends on the thermal conductivity of the glass sheet to reach a temperature in its forming range. When the glass sheet is at a temperature in its forming range, the glass sheet is formed to a predetermined shape of the blocks. Once formed, the glass sheet is either quenched, annealed or tempered.

Although the above lehr works well, it suffers from the disadvantage that the lehr must be long in length to allow the glass sheet to be heated at the predetermined rate. This length requires a large quantity of floor space energy consumption and cost. As a result, there is a need in the art to heat a glass sheet quickly in a controlled manner to allow the glass sheet to be formed and to reduce the length of the lehr.

SUMMARY OF THE INVENTION

Accordingly, the present invention is a method for heating a glass sheet. The method includes the steps of heating a glass sheet to at least a first predetermined temperature and applying microwave energy to the glass sheet to heat the glass sheet to at least a second predetermined temperature to allow the glass sheet to be formed.

One advantage of the present invention is that an improved method for heating a glass sheet is provided. Another advantage of the present invention is that the method uses microwave energy to heat the glass sheet quickly once the glass sheet is at or above its softening point. Yet another advantage of the present invention is that the method reduces the length of the lehr, resulting in less floor space and increased throughput (speed and yield) of glass sheets formed. Still another advantage of the present invention is that the method reduces maintenance costs, tooling costs, and energy consumption. A further advantage of the present invention is that the method provides a clean and efficient means of inducing heat in a glass sheet and improves heat transfer efficiency therein.

Other features and advantages of the present invention will be readily appreciated as the same becomes better understood after reading the subsequent description when taken in conjunction with the accompanying drawings.

BRIEF DESCRIPTION OF THE DRAWINGS

FIG. 1 is a fragmentary elevational view of a lehr for use in conjunction with a method for heating a glass sheet, according to the present invention.

FIG. 2 is a sectional view taken along line 2—2 of FIG. 1.

FIG. 3 is a sectional view taken along line 3—3 of FIG. 1.

FIG. 4 is a sectional view taken along line 4—4 of FIG. 1.

DESCRIPTION OF THE PREFERRED EMBODIMENT(S)

Figure 5:
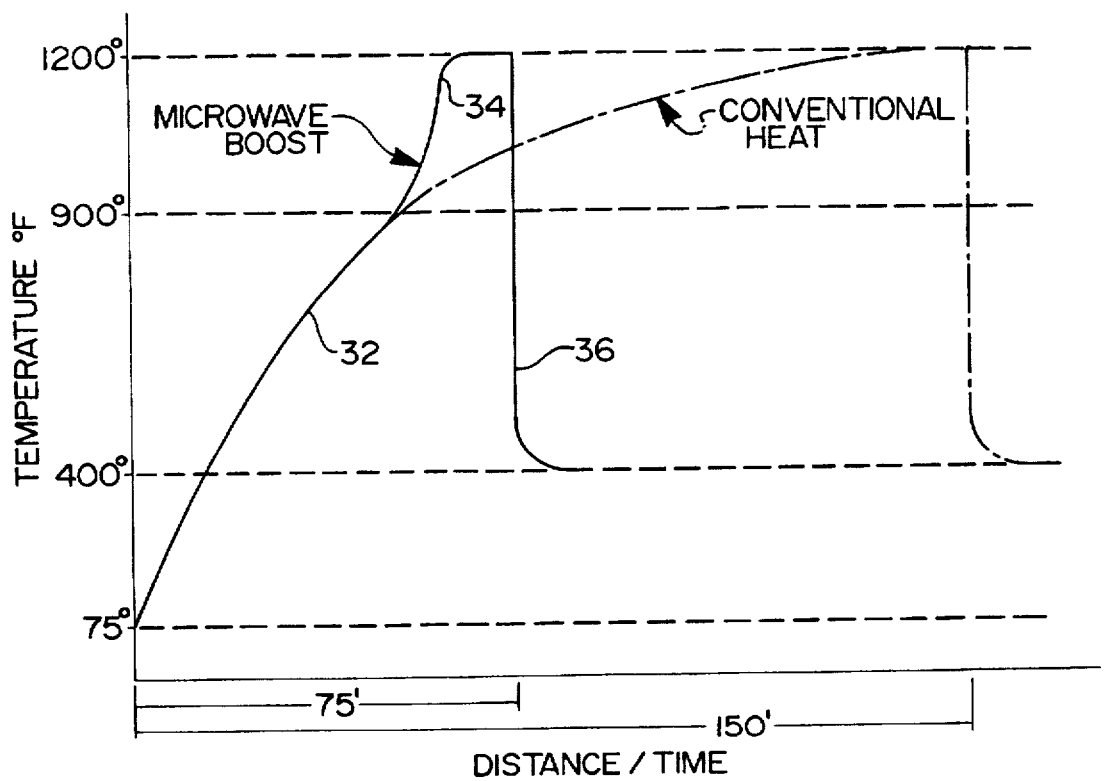
FIG. 5 is a graph of temperature versus rate of a glass sheet heated by a method, according to the present invention.

Referring to the drawings and in particular to FIG. 1, one embodiment of a lehr 10 for use in conjunction with a method for heating a glass templet or sheet 11, according to the present invention, is shown. As illustrated, the lehr 10 is of a gas-type continuous furnace although a roller type or fixtured roller-type continuous furnace may be used.

The lehr 10 includes an upper housing 12 extending longitudinally and having a plurality of heaters 14 spaced longitudinally therealong. The heaters 14 are of the radiant type as is known in the art. The lehr 10 also includes a lower housing 16 extending longitudinally and having a plurality of blocks 18 disposed longitudinally therealong. The blocks 18 are made of a ceramic material with apertures (not shown) extending therethrough as is known in the art. As illustrated in FIGS. 2 through 4, the blocks 18 include a plurality of flat blocks 18a, transition blocks 18b and finish blocks 18c. The flat blocks 18a have a planar upper surface and the transition blocks 18b and finish blocks 18c have a curved upper surface of varying degree to form the glass sheet 11 to a predetermined curvature as is known in the art. It should be appreciated that the glass sheet 11 "floats" on a blanket or cushion of air from a source (not shown) passing through the apertures in the blocks 18. It should also be appreciated that the glass sheet 11 is moved by chains (not shown) as is known in the art. It should further be appreciated that, up to this point in the description, the lehr 10 is conventional and known in the art.

Referring to FIG. 1, the lehr 10 includes a microwave energy apparatus, generally indicated at 20, disposed at a position along the length of the lehr 10. The microwave energy apparatus 20, partially shown, includes a conduit 22 extending longitudinally and having a reflector 24 in a corner thereof to direct microwave energy through a downward portion of the conduit 22. The microwave energy apparatus 20 includes a shield 26 at one end of the conduit 22 to columnate the microwave energy and form a transverse curtain of microwave energy (e.g. six inches) toward the blocks 18. The lehr 10 includes uplift doors 28 and 30 on each longitudinal end of the shield 26 to allow entry and exit of the glass sheet 11 into a contained area for the microwave energy. The microwave energy apparatus 20 is a self-contained unit having a microwave energy frequency of two (2) to forty (40) gigahertz. Preferably, the frequency of the microwave energy is less than thirty-six (36) gigahertz. It should be appreciated that the microwave energy apparatus 20 is a Gyrotron type commercially available from Continental Electronics of Dallas, Tex. It should also be appreciated that the microwave energy apparatus 20 may be used with a lehr of the roller-type or fixtured roller-type. It should further be appreciated that a temperature measuring device is used to measure the temperature of the glass sheet 11 which is conventional and known in the art.

In operation, the lehr 10 may be used to form the glass sheet 11 as a windshield for a motor vehicle (not shown) by a method, according to the present invention. The method includes placing a flat or planar glass sheet 11 on the flat blocks 18a at one end of the lehr 10. The method includes moving the glass sheet 11 along the flat blocks 18a at a predetermined rate and heating the glass sheet 11 to a predetermined temperature with the heaters 14. For example, the glass sheet 11 is heated by the heaters 14 using an ambient heat of over 1400° F. as the glass sheet 11 travels a certain distance over time to heat the glass sheet 11 to a predetermined temperature. In one embodiment, the predetermined temperature is the softening point of the glass sheet 11 which is approximately 900° F. to 950° F. As illustrated in FIG. 5, a curve 32 represents the temperature of the glass sheet 11 as it moves over distance/time through the lehr 10 as is known in the art.

When the glass sheet 11 is at its softening point, the glass sheet 11 is disposed between the uplift doors 28 and 30. The method includes applying microwave energy to the glass sheet 11 when the glass sheet 11 is at or above its softening point as represented by the curve 34 illustrated in FIG. 5. It should be appreciated that if the glass sheet 11 is below its softening point, the microwave energy may break the glass sheet 11.

The method includes moving the glass sheet 11 at a predetermined rate under the curtain of the microwave energy columnated by the shield 26 and rapidly heating the glass sheet 11 with the microwave energy to a predetermined temperature. In one embodiment, the predetermined temperature of the glass sheet 11 is its forming range of approximately 1150° F. to 1250° F. For example, the temperature of the glass sheet 11 can be raised from 900° F. to over 1200° F. in less than ten (10) seconds as illustrated in FIG. 5. The microwave energy heats the glass sheet 11 directly by generating heat at the molecular level by creating polar orientation movement very rapidly resulting in instantaneous and uniform heating through the thickness of the glass sheet 11. It should be appreciated that microwave frequencies as low as two gigahertz can be used when the glass sheet 11 is above 900° F. It should also be appreciated that the predetermined rate is based on the intensity of the microwave energy and the coupling rate of the glass sheet. It further also be appreciated that the ambient temperature of the lehr 10 before the uplift door 28 is approximately 1200° F. and the ambient temperature of the lehr 10 after the uplift door 30 is approximately 1250° F. to maintain the glass sheet 11 at its forming temperature.

When the glass sheet 11 passes beyond the uplift door 30, the method includes forming the glass sheet 11 to a predetermined configuration or curvature. The glass sheet 11 begins to bend to the curvature of the transition blocks 18b and final blocks 18c. The method includes cooling the glass sheet 11 with cool air once the glass sheet 11 exits the lehr 10 to below its softening point as represented by the curve 36 illustrated in FIG. 5.

Accordingly, the method of the present invention provides a way to quickly heat the moving glass sheet 11 by providing a curtain of microwave energy through which the glass sheet 11 is passed inside the lehr 10. The microwave energy is applied based on the size and thickness of the glass sheet 11 to bring the temperature of the glass sheet 11 up to its forming range for the forming process. As illustrated in FIG. 5, the method of the present invention heats the glass sheet 11 to the forming range in less distance/time than conventional radiant heating in the lehr 10.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method for heating a glass sheet comprising the steps of:

heating a glass sheet to at least a first predetermined temperature;

columnating microwave energy; and applying a curtain of the columnated microwave energy having a frequency of two to forty gigahertz to the glass sheet to heat the glass sheet to at least a second predetermined temperature greater than said first predetermined temperature to allow the glass sheet to be subsequently formed to a predetermined configuration.

2. A method as set forth in claim 1 including a step of moving the glass sheet during said step of heating the glass sheet to at least the first predetermined temperature.

3. A method as set forth in claim 1 wherein said first predetermined temperature is approximately 900° F. to 950° F.

4. A method as set forth in claim 1 wherein said step of heating the glass sheet to at least the first predetermined temperature comprises heating the glass sheet to at least the first predetermined temperature at a first predetermined rate.

5. A method as set forth in claim 1 wherein said step of applying comprises applying said curtain of the columnated microwave energy to the glass sheet when the glass sheet has reached at least the first predetermined temperature.

6. A method as set forth in claim 1 wherein said step of applying comprises applying said curtain of the columnated microwave energy to the glass sheet at a predetermined rate.

7. A method as set forth in claim 6 wherein said second predetermined temperature is approximately 1150° F. to 1250° F.

8. A method as set forth in claim 1 wherein said step of applying comprises moving the glass sheet through the curtain of the columnated microwave energy and heating the glass sheet to at least the second predetermined temperature.

9. A method as set forth in claim 1 including a step of forming the glass sheet to a predetermined configuration after the glass sheet has reached at least the second predetermined temperature.

10. A method as set forth in claim 9 including a step of cooling the glass sheet to a temperature below at least the first predetermined temperature.

11. A method for heating a glass sheet comprising the steps of:

moving a glass sheet and heating the glass sheet to at least a first predetermined temperature;

columnating microwave energy; and applying a curtain of the columnated microwave energy having a frequency of two to forty gigahertz to the glass sheet and heating the glass sheet to at least a second predetermined temperature greater than said first predetermined temperature to allow the glass sheet to be subsequently formed to a predetermined configuration.

12. A method as set forth in claim 11 wherein said first predetermined temperature is approximately 900° F. to 950° F.

13. A method as set forth in claim 11 wherein said step of applying comprises applying said curtain of the columnated microwave energy to the glass sheet when the glass sheet has reached at least the first predetermined temperature.

14. A method as set forth in claim 11 wherein said step of applying comprises applying said curtain of the columnated microwave energy to the glass sheet at a predetermined rate.

15. A method as set forth in claim 11 wherein said second predetermined temperature is approximately 1150° F. to 1250° F.

16. A method as set forth in claim 11 wherein said step of applying comprises moving the glass sheet through the curtain of the columnated microwave energy and heating the glass sheet to at least the second predetermined temperature to allow the glass sheet to be subsequently formed.

17. A method as set forth in claim 11 including a step of forming the glass sheet to a predetermined configuration after the glass sheet has reached at least the second predetermined temperature.

18. A method as set forth in claim 17 including a step of cooling the glass sheet to a temperature below the at least first predetermined temperature.

19. A method for heating a glass sheet comprising the steps of:

moving a glass sheet and heating the glass sheet to at least a first predetermined temperature at a first predetermined rate;

columnating microwave energy;

applying a curtain of the columnated microwave energy having a frequency of two to forty gigahertz to the glass sheet at a second predetermined rate when the glass sheet has reached at least the first predetermined temperature and heating the glass sheet to at least a second predetermined temperature; and forming the glass sheet to a predetermined configuration after the glass sheet has reached at least the second predetermined temperature.

\* \* \* \* \*